United States Patent
Dwyer et al.

(10) Patent No.: US 10,973,211 B2
(45) Date of Patent: Apr. 13, 2021

(54) SUBMERGED FEED DISPERSER FOR AQUACULTURE SYSTEM

(71) Applicant: InnovaSea Systems, Inc., Boston, MA (US)

(72) Inventors: Rodney J. Dwyer, Bainbridge Island, WA (US); Joseph L. Laughlin, Medford, OR (US); Francisco Javier Padilla Magan, Cadiz (ES); Tyler Sclodnick, Quincy, MA (US)

(73) Assignee: InnovaSea Systems, Inc., Boston, MA (US)

( * ) Notice: Subject to any disclaimer, the term of this patent is extended or adjusted under 35 U.S.C. 154(b) by 350 days.

(21) Appl. No.: 16/189,927

(22) Filed: Nov. 13, 2018

(65) Prior Publication Data

US 2019/0150410 A1    May 23, 2019

Related U.S. Application Data

(60) Provisional application No. 62/590,082, filed on Nov. 22, 2017.

(51) Int. Cl.
*A01K 61/80* (2017.01)
*A01K 61/60* (2017.01)

(52) U.S. Cl.
CPC ............. *A01K 61/80* (2017.01); *A01K 61/60* (2017.01)

(58) Field of Classification Search
CPC ........ A01K 61/80; A01K 61/85; A01K 61/95; A01K 61/60; A01K 61/00; A01K 61/10;
(Continued)

(56) References Cited

U.S. PATENT DOCUMENTS

| 4,373,286 A | * | 2/1983 | Robison | A01K 69/00 43/10 |
| 4,492,182 A | * | 1/1985 | Wensman | A01K 5/02 119/51.04 |
| 4,638,588 A | * | 1/1987 | Abadie | A01K 61/80 43/44.99 |

(Continued)

FOREIGN PATENT DOCUMENTS

| JP | 64-006867 U | 1/1989 |
| JP | 06-327376 A | 11/1994 |

(Continued)

OTHER PUBLICATIONS

Dwyer, R.J., "Attachment Structure for a Fish Pen Feed Disperser," U.S. Appl. No. 29/670,103, filed Nov. 13, 2018, 7 pages.
(Continued)

*Primary Examiner* — Kristen C Hayes
(74) *Attorney, Agent, or Firm* — Christensen O'Connor Johnson Kindness, PLLC

(57) ABSTRACT

A fish feed dispersing apparatus includes a helical dispersing tube attached to a fish pen with a mounting assembly. The helical dispersing tube has an inlet end that receives fish feed from a source, and includes a number of spaced apertures that disperse the received fish feed. A mounting assembly supports the dispersing tube, and includes two spaced-apart attachment members connected by a plurality of elongate members, and a plurality of hanger subassemblies. Each hanger subassembly has a first end attached to one of the elongate members and a second end that includes a clamp configured to engage the helical dispersing tube. The hangar assemblies are adjustable, and support the helical dispersing tube during use.

23 Claims, 6 Drawing Sheets

(58) Field of Classification Search
CPC ........ A01K 69/00; A01K 97/00; A01K 97/02; A01K 5/00; A01K 15/026
See application file for complete search history.

(56) References Cited

U.S. PATENT DOCUMENTS

| | | | | |
|---|---|---|---|---|
| 5,299,530 | A | * | 4/1994 | Mukadam ............... A01K 61/60 119/223 |
| 5,617,813 | A | * | 4/1997 | Loverich ............... A01K 61/60 119/223 |
| 5,628,279 | A | * | 5/1997 | Bones, IV ............. A01K 61/60 119/215 |
| 5,970,917 | A | * | 10/1999 | Keith, Jr. .............. A01K 61/70 119/223 |
| 8,028,660 | B2 | * | 10/2011 | Troy ...................... A01K 61/60 119/223 |
| 8,117,992 | B2 | * | 2/2012 | Parsons ................. A01K 61/10 119/227 |
| 8,424,491 | B2 | | 4/2013 | Page |
| 8,651,059 | B2 | | 2/2014 | Cartwright et al. |
| 9,072,282 | B2 | | 7/2015 | Madsen et al. |
| 2017/0238511 | A1 | | 8/2017 | Gace et al. |

FOREIGN PATENT DOCUMENTS

| | | |
|---|---|---|
| KR | 20-0454434 Y1 | 7/2011 |
| KR | 10-1064806 B1 | 9/2011 |

OTHER PUBLICATIONS

International Search Report and Written Opinion dated Mar. 11, 2019, issue in corresponding International Application No. PCT/US2018/060601, filed Nov. 13, 2018, 13 pages.

\* cited by examiner

SUBMERGED FEED DISPERSER FOR AQUACULTURE SYSTEM

CROSS-REFERENCE TO RELATED APPLICATION

This application claims the benefit of Provisional Application No. 62/590,082, filed Nov. 22, 2017, which is hereby incorporated by reference herein.

BACKGROUND

The seas and other natural water reservoirs have provided an abundant and stable supply of sustenance for millennia. In recent years, however, over-fishing, inefficient harvesting practices, and environmental stressors have resulted in the depletion or decline of certain fish populations in many regions. At the same time, an increasing human population, increasing standards of living, and an increasing awareness of the health benefits of seafood have increased the demand for fish and fish product.

Advances in aquaculture in general, and fish farming in particular, and improvements in technology have recently been applied to meet world demand for fish product efficiently and at lower costs. Developments in fish farming also reduce the risks associated with over-fishing existing fish populations. In particular, off-shore cultivation systems employing fish cages or fish pens have found some success. Large, submersible fish pens suitable for aquaculture applications are known in the art to aid in the efficient and bio-responsible cultivation of food sources. Fish pens are placed in a natural body of water, such as a lake, river, or ocean, and stocked with young fish or fry, and the fish are fed and maintained until they reach maturity. The fish pens provide a habitat and protection for the fish. Fish pens may be used for freshwater or for saltwater aquaculture.

Some conventional fish farming systems provide a pen that is anchored to the ocean floor. In one embodiment, a fish pen includes four spar buoys with damper plates coupled to the bottom that dampen the buoy motion caused by wave action. The four spar buoys are typically arranged in a rectangular array with a net fastened to the spar buoys to define a box-like enclosure. Anchor lines extend outwardly and downwardly from each spar buoy to support the nets.

More recent innovations in fish pens employing a center spar buoy or center cluster of spar buoys are disclosed in U.S. Pat. No. 5,359,962, to Loverich, and in U.S. Pat. No. 5,617,813, to Loverich et al., both of which are hereby incorporated by reference in their entireties. Loverich et al. discloses a mobile pen for raising fish or shellfish having an elongate central vertical spar buoy surrounded by at least one net-supporting rim assembly with continuous netting extending from an upper end of the spar buoy to the rim assembly and thence to a lower, submerged end of the spar buoy. For example, a novel open sea center spar fish pen having an elongate spar buoy, and one or more rim assemblies attached to the spar buoy is disclosed in U.S. Pat. No. 9,072,282, to Madsen et al., which is hereby incorporated by reference in its entirety.

A submerged feed disperser system for an open sea fish pen is disclosed herein that increases the effective volume over which feed is delivered inside a fish pen in a submerged state. The feed disperser allows more fish to eat to satiation by reducing competition for feed. The reduced competition for feed encourages consistent fish growth within a population, while reducing aggression during feeding, and reducing the loss or waste of feed pellets during feeding. The feed disperser has also been found to produce an improved coefficient of variation in fish size by allowing less aggressive fish to more easily acquire and consume feed, decreasing fish mortality and improving the feed conversion ratio. The feed disperser has been found to reduce damage to pelletized fish feed during dispersal of the feed.

Less efficient alternate means for distributing feed within fish pens currently in use employ a small concentrated feed outflow point, typically using a structure with four distribution points arranged in a row and spread over a relatively short distance, for example one meter. In these prior art systems feed is delivered over a small area resulting in intense competition for feed and a highly skewed distribution of feed consumption towards larger, more aggressive fish.

Other fish feed systems are known in the art. U.S. Pat. No. 7,743,733, to Harrison et al., which is hereby incorporated by reference in its entirety, discloses an offshore aquaculture system including a fish feeding apparatus configured to dispense a slurry containing fish feed in streams upwardly and outwardly from a dispenser head at a number of circumferentially spaced outlets at the water surface.

U.S. Pat. No. 9,655,347, to Troy et al., which is hereby incorporated by reference in its entirety, discloses an open ocean fish farm structure including a feeding system that distributes fish feed through a plurality of individual feeder hoses, each hose extending from a feed storage bin to a point on the upper aspect of the surface of the fish enclosure.

U.S. Pat. No. 9,326,493, to Han et al., which is hereby incorporated by reference in its entirety, discloses an automatic feeding system for an underwater farm with a single feeding hose that is connected to a mixing tank containing the fish feed, and extends to the underwater fish farm.

These prior art fish feeding systems do not disperse fish feed throughout the fish enclosure in a manner that discourages competition for food, and encourages a more equitable distribution of food to provide more optimal and consistent feeding.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A fish feed dispersing apparatus for an aquaculture fish pen includes a helical dispersing tube having an inlet that receives fish feed from a source. A plurality of spaced-apart apertures in the helical dispersing tube disperse the received fish feed. A mounting assembly with two spaced-apart attachment members is fixed to the fish pen with a plurality of elongate members extending between the two spaced-apart attachment members. A number of hanger subassemblies are adjustably supported on the plurality of elongate members. Each hanger subassembly has a proximal end attached to a corresponding one of the elongate members and a distal end with a clamp configured to engage the helical dispersing tube.

In an embodiment the plurality of apertures are not aligned on the helical feed dispersing tube.

In an embodiment the plurality of apertures open outwardly away from the helical dispersing tube.

In an embodiment the two attachment members are configured to be fixed to a spar buoy of the fish pen.

In an embodiment the helical dispersing tube continuously decreases in elevation such that the plurality of spaced apertures are at different depths.

In an embodiment a distal end of the helical dispersing tube is an open outlet.

In an embodiment the helical dispersing tube defines a circular helix.

In an embodiment each of the hanger subassemblies comprises a first arm that defines the proximal end and the distal end, and further comprising a second arm having a proximal end connected to the corresponding elongate member and a distal end that engages the first arm at a selectable intermediate location on the first arm. For example, the plurality of elongate members may have a plurality of apertures for attaching the proximal end of the first arm and the second arm to a selectable location on the corresponding elongate member.

In an embodiment the helical dispersing tube is elastic, and wherein a pitch of the helical dispersing tube is determined by the selected location of the hanger assemblies on the corresponding elongate members.

In an embodiment the plurality of hanger subassemblies comprise at least four hanger subassemblies.

In an embodiment the plurality of apertures disposed at spaced intervals along the helical dispersing tube comprise at least seven apertures.

In an embodiment the first and second arms are configured to pivot toward the corresponding elongate member into a folded position when the helical dispersing tube is removed.

A center spar fish pen includes a center spar buoy connected to a rim assembly with a cable system, and a fish enclosure defining an enclosed volume and attached to the spar buoy and to the rim assembly. A fish feed dispersing apparatus is disposed within the enclosed volume of the fish enclosure. The dispersing apparatus includes a helical dispersing tube having an inlet end configured to receive fish feed from a source of fish feed and a plurality of apertures disposed at spaced intervals along the helical dispersing tube, a mounting assembly having two spaced-apart attachment members configured to be fixed to the fish pen, a plurality of elongate members attached to and extending between the two attachment members, and a plurality of hanger subassemblies, each hanger subassembly having a proximal end attached to a corresponding one of the plurality of elongate members and a distal end comprising a clamp configured to engage the helical dispersing tube.

In an embodiment the plurality of apertures are not aligned on the helical feed dispersing tube.

In an embodiment the plurality of apertures open outwardly away from the helical dispersing tube.

In an embodiment the fish feed dispersing apparatus is fixed to the spar buoy, the helical dispersing tube continuously decreases in elevation such that the plurality of spaced apertures are at different depths.

In an embodiment a distal end of the helical dispersing tube is an open outlet.

In an embodiment each of the hanger subassemblies comprises a first arm that defines the proximal end and the distal end, and further comprises a second arm having a proximal end connected to the corresponding elongate member and a distal end that engages the first arm at a selectable intermediate location on the first arm.

In an embodiment the plurality of elongate members each comprises a plurality of apertures for attaching the proximal end of the first arm and the second arm to a selectable location on the corresponding elongate member.

In an embodiment the helical dispersing tube is elastic, and wherein a pitch of the helical dispersing tube is determined by the selected location of the hanger assemblies on the corresponding elongate members.

In an embodiment the plurality of hanger subassemblies comprise at least four hanger subassemblies.

In an embodiment the plurality of apertures disposed at spaced intervals along the helical dispersing tube comprise at least seven apertures.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
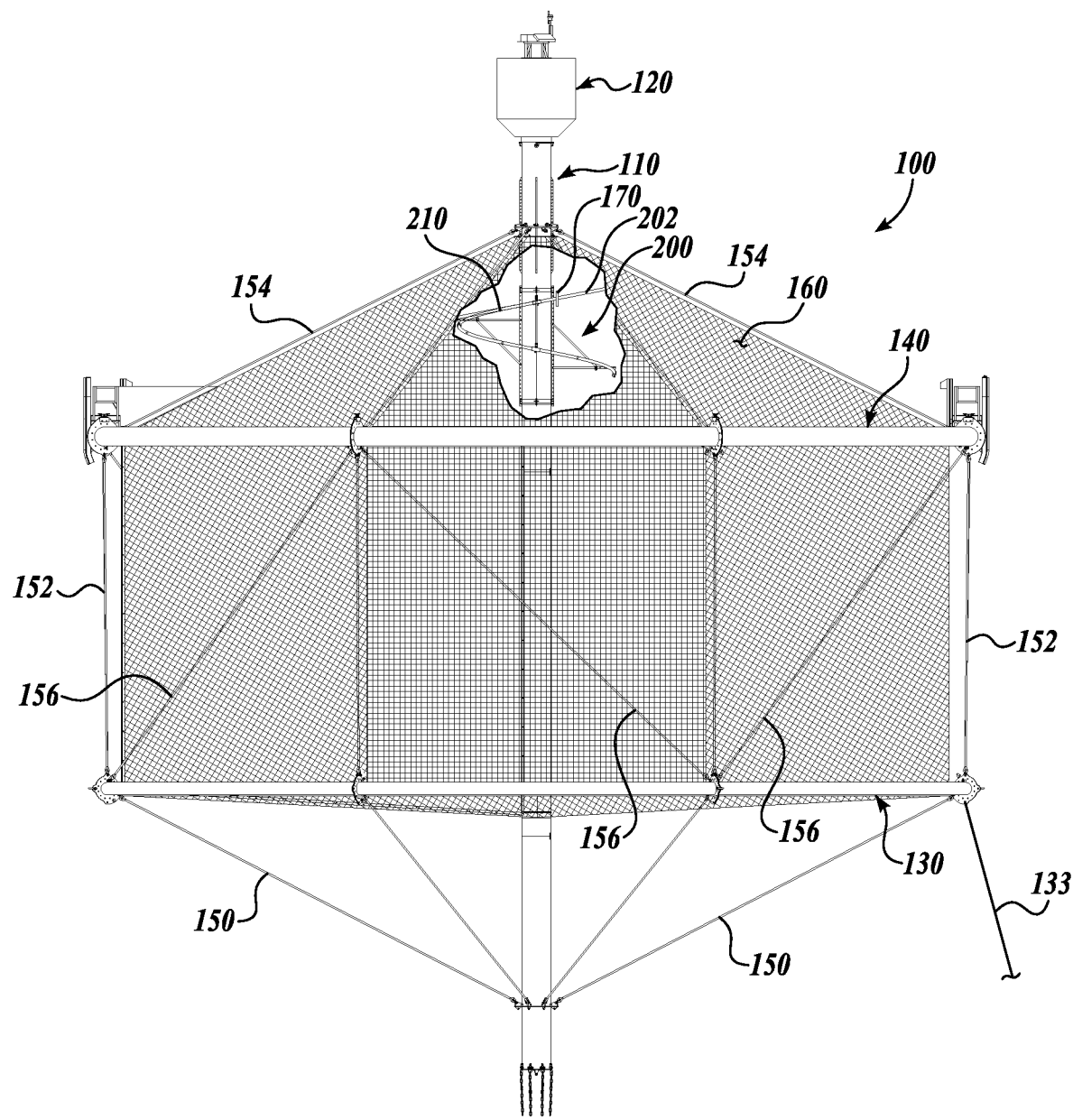
FIG. 1 is a front view of a vertical spar fish pen having a feed dispersing assembly in accordance with the present invention.

A fish pen 100 with a helical feed dispersing assembly 200 in accordance with the present invention is shown in FIG. 1. The fish pen 100 includes an elongate center spar buoy 110 that is configured to remain upright in the body of water. A lower rim assembly 130 and an upper rim assembly 140 are horizontally disposed about the spar buoy 110, and are attached to the spar buoy 110 with a cable assembly formed from a system of cables 150, 152, 154, 156, and optionally anchored with a mooring line or hawser 133 that is fixed to an object or anchor (not shown) to anchor the fish pen 100. An enclosure 160, for example a netting assembly, is supported by the center spar buoy 110 and the rim assemblies 130, 140, and is configured for retaining fish therein. The fish pen 100 is configured to be movable between a submerged position wherein substantially all of the enclosure 160 is below the waterline, and a surfaced position wherein at least a portion of the enclosure 160 is above the waterline. In other embodiments the center spar fish pens may have more or fewer rim assemblies and different enclosure and/or cabling configurations, as will be apparent to persons of skill in the art.

For example, the fish pen 100 may be assembled at, and/or towed to, a desired location for raising fish and anchored in place. The fish pen 100 allows the fish to be raised in, and benefit from, a natural sea environment while also being protected from predators. In some applications, the fish pen 100 is configured to be towed or otherwise repositioned while fully assembled, and with or without a live fish population, for example, to allow the fish pen to be relocated to optimal locations to accommodate seasonal or weather-related changes.

A portion of the enclosure 160 is illustrated in cutaway to show an exemplary helical feed dispersing assembly 200 that is mounted to the spar buoy 110 and connected to a feed supply line 202. The helical feed disperser 200 is attached to the center spar buoy 110 at a selectable axial location within the enclosure 160, for example, on an upper portion of the spar buoy 110. A feed supply line 202 provides fish feed to the feed dispersing assembly 200 from a source of fish feed (not shown) that may be located outside of the enclosure 160. For example, the supply line 202 may be fixedly attached to the fish pen 100, or may be deployable, for example, comprising a hose from a supply vessel or barge.

The feed dispersing assembly 200 includes a helical feed dispersing tube 210 that is configured to increase the effective volume over which fish feed is delivered inside the enclosure 160. By more effectively distributing the feed among the fish population, a greater percentage of the fish population are able to eat to optimal satiation, and potentially destructive competition between fish for feed is decreased. The more equitable distribution of feed provides for a more uniform and healthy fish population, reduced aggression during feeding, and reduced loss of feed from feed pellets falling through the fish pen. Improving the distribution of the feed also results in improved (i.e., reduced) coefficient of variation (CV) in the fish size.

Figure 2A:
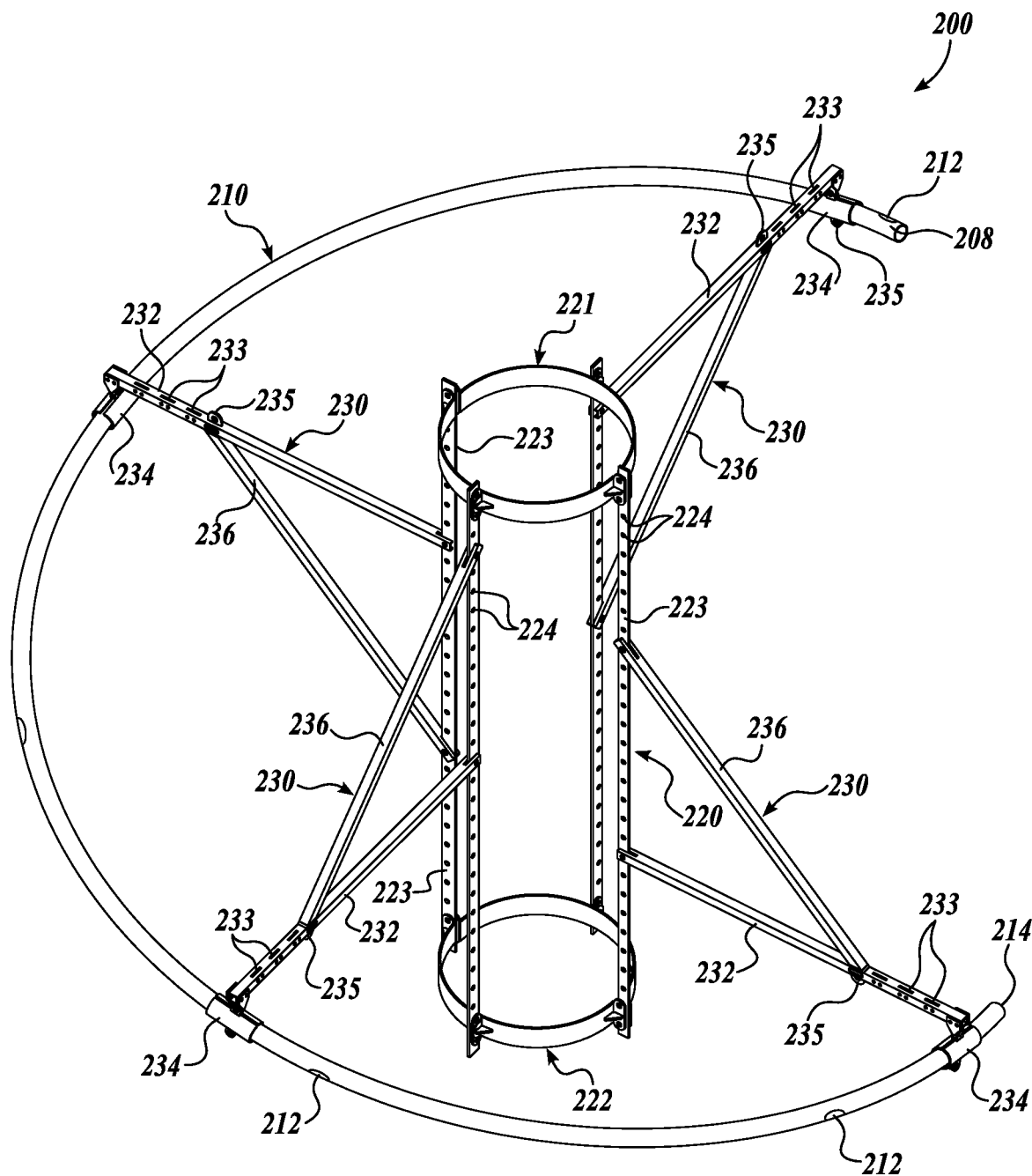
FIG. 2A is a perspective view of the fish pen feed dispersing assembly shown in FIG. 1.
Figure 2B:
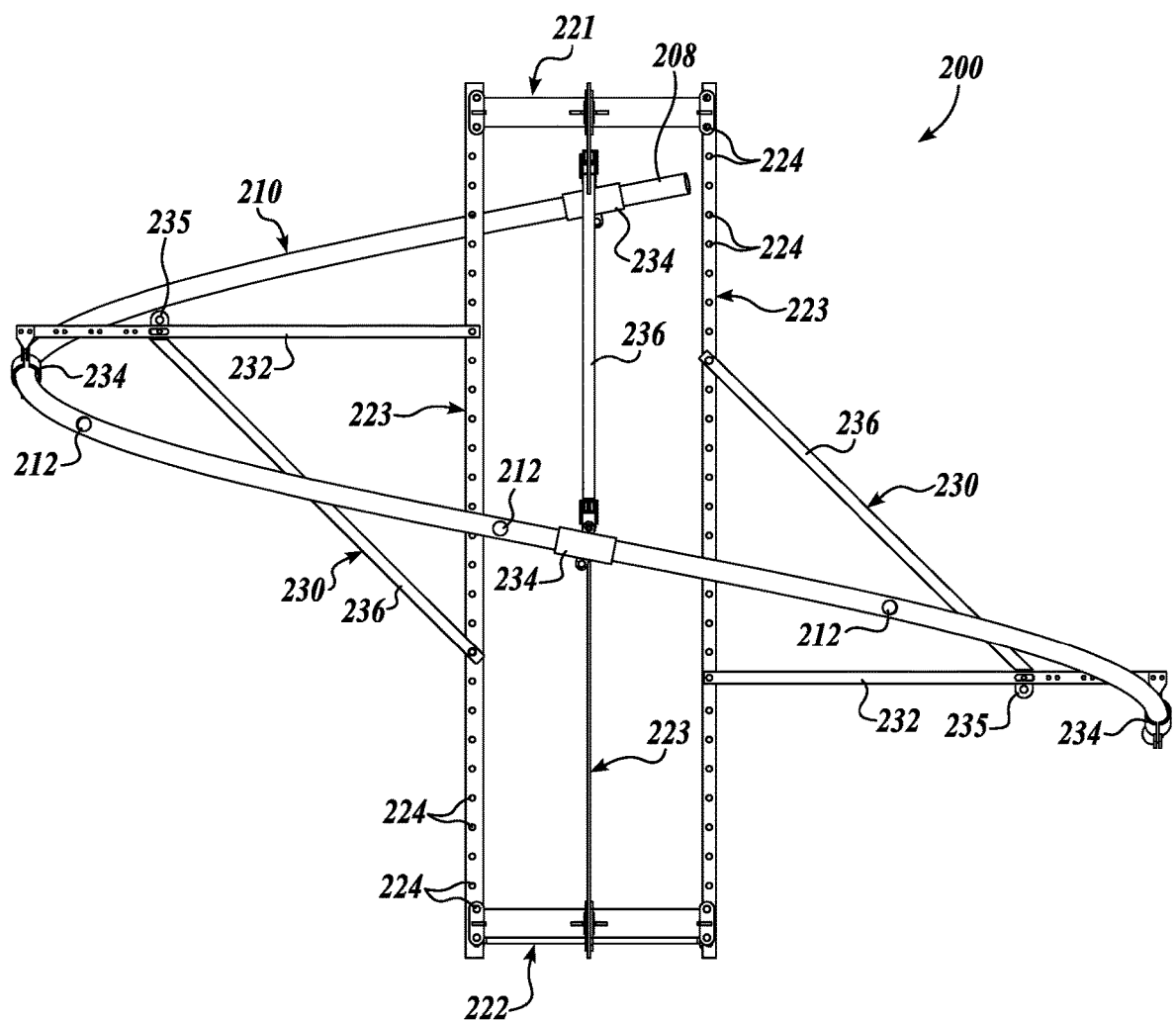
FIG. 2B is a front view of the fish pen feed dispersing assembly shown in FIG. 1.
Figure 2C:
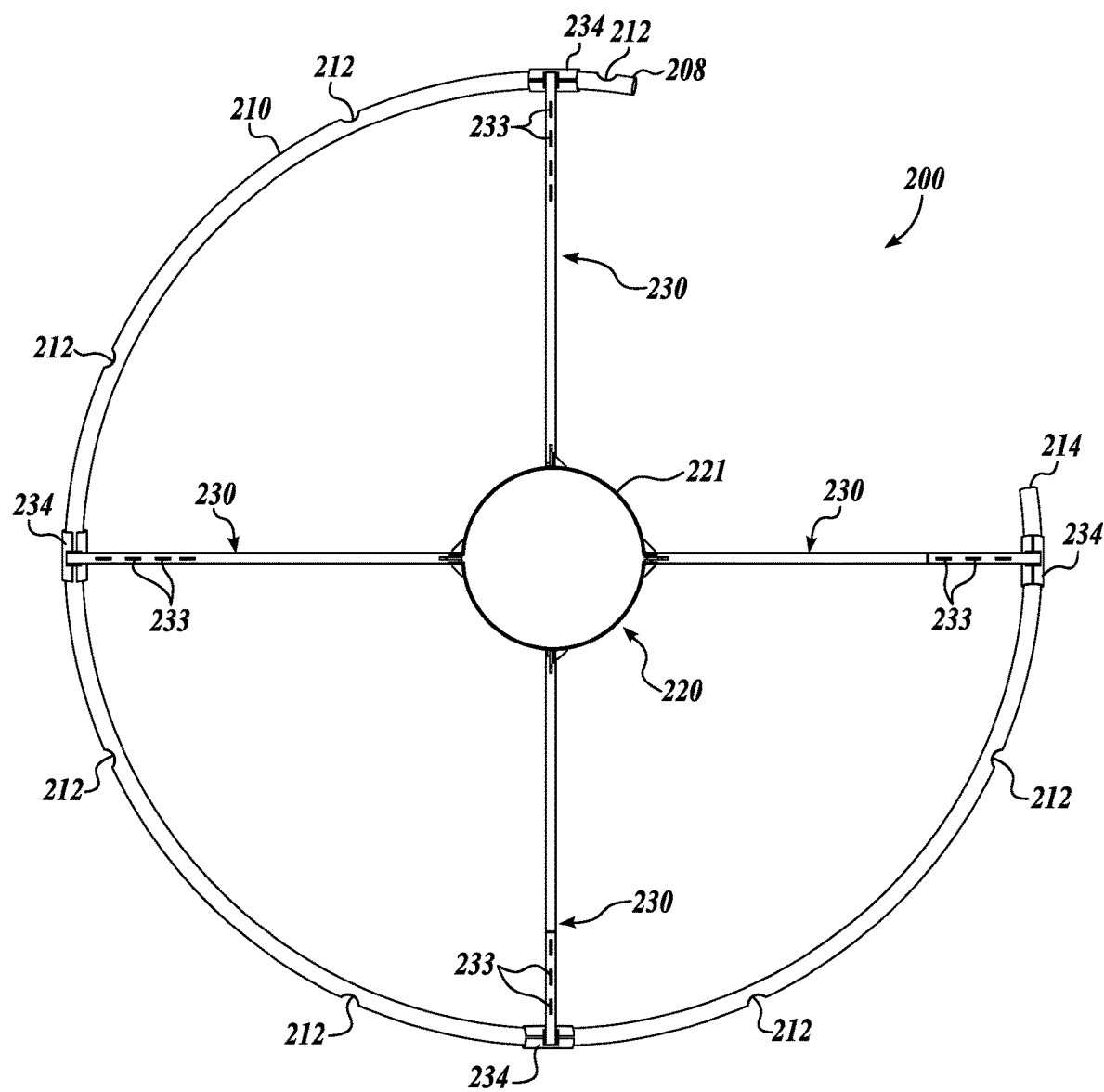
FIG. 2C is a top plan view of the fish pen feed dispersing assembly shown in FIG. 1.

FIG. 2A is a perspective view of the feed dispersing assembly 200, FIG. 2B is a front view of the dispersing assembly 200, and FIG. 2C is a plan view of the dispersing assembly 200. The feed dispersing assembly 200 includes the helical dispersing tube 210 and an attachment or hanger assembly 220, that attaches the helical dispersing tube 210 to the spar buoy 110 (FIG. 1) and maintains the dispersing tube 210 in a desired configuration. In the current embodiment the hanger assembly 220 is adjustable. Preferably, the dispersing tube 210 is flexible, such that the pitch (and axial length) of the helical dispersing tube 210 can be set to provide optimal feed dispersion. The adjustable hanger assembly 220 is configured to accommodate different dispersing tubes 210 and to accommodate different pitches for any particular dispersing tube 210. Although the helical dispersing tube 210 in this embodiment is shown with a generally constant diameter, right circular helical shape, it is contemplated that in other embodiments the helical shape may be non-circular, for example elliptical or with sinuous sections, and/or the helical shape may have a non-uniform radius, for example a conical or other non-regular helical shape.

The dispersing tube 210 has a proximal end 208 that is configured to be connected to the feed supply line 202 with a low-turbulence connection 170, as discussed below and illustrated in FIG. 4. The dispersing tube 210 has a plurality of spaced-apart apertures 212 distributed along the length of the tube 210 that provide a plurality of outflow feed streams during use. The size, position and orientation of the apertures 212 may be selected to provide a desired outflow volume and dispersal pattern. In some embodiments a plurality of interchangeable dispersing tubes 210 are provided, to allow the user to optimize the fish feeding apparatus to accommodate particular fish food characteristics, fish feeding requirements, and the like. In a current embodiment the apertures 212 are between one and five inches in diameter. A distal end 214 of the dispersing tube 210 is preferably open and provides an additional feed stream. The distal end 214 may include a flow restrictor (not shown) to achieve a desired pressure in the dispersing tube 210 during use.

In a particular embodiment the helical dispersing tube 210 is an HDPE (high density polyethylene) hose and has a length between twenty and two hundred feet, and an inside diameter between one and six inches, for example, a constant inside diameter of three inches. In some embodiments the diameter of the dispersing tube 210 may vary along the length of the dispersing tube 210. As fish feed pellets are pumped into the feed dispersing tube 210 from the supply line 202, a large percentage of the feed is expelled through the apertures 212 along the length of the dispersing tube 210.

In an exemplary embodiment the feed dispersing tube 210 is fifty feet long and has a three-inch inside diameter. The apertures 212 have a diameter between 1.0 inches and 1.5 inches and are spaced approximately six feet apart along the length of the dispersing tube 210. In a representative embodiment the aperture 212 size and orientations are as follows: (i) a first aperture 212 is located one-half foot from the proximal end 208 (measured along the tube 210), has a diameter of 1 inch, and is oriented outwardly (from the helical feed dispersing tube 210) and zero degrees from horizontal; (ii) a second aperture 212 is located seven feet from the proximal end 208, has a diameter of 1.5 inches, and is oriented outwardly and zero degrees from horizontal; (iii) a third aperture 212 is located fourteen feet from the proximal end 208, has a diameter of 1.5 inches, and is oriented outwardly and upwardly 22.5 degrees from horizontal; (iv) a fourth aperture 212 is located twenty-one feet from the proximal end 208, has a diameter of 1.5 inches, and is oriented outwardly and upwardly 45 degrees from horizontal; (v) a fifth aperture 212 is located twenty-seven feet from the proximal end 208, has a diameter of 1.5 inches, and is oriented outwardly and upwardly 45 degrees from horizontal; (vi) a sixth aperture 212 is located 34 feet from the proximal end 208, has a diameter of 1.5 inches, and is oriented outwardly and upwardly 22.5 degrees from horizontal; and (vii) a seventh aperture 212 is located forty-four feet from the proximal end 208, has a diameter of 1.5 inches, and is oriented outwardly and zero degrees from horizontal. In this embodiment the distal end 214 of the dispersing tube 210 is open such that a portion of the fish feed is expelled from the open end.

Other embodiments are contemplated and have a different number, size, and distribution of apertures 212.

Referring still to FIGS. 2A, 2B, and 2C, the hanger assembly 220 includes an upper attachment member 221 and a lower attachment member 222. The attachment members 221, 222 attach the hanger assembly 220 to the spar buoy 110. For example, the upper and lower attachment members 221, 222 may be split ring clamps. The upper and lower attachment members 221, 222 are connected by a plurality of elongate joining members 223 (four shown) that extend between the attachment members 221, 222. The elongate members 223 have a plurality of apertures 224 spaced along the length of the elongate members 223, some of which receive bolts or other connecting hardware (not shown) for fixing the elongate members 223 to the attachment members 221, 222.

A plurality of adjustable hanger subassemblies 230 are configured to attach to a corresponding one of the elongate members 223, and to support the dispersing tube 210. The hanger subassemblies 230 include a first arm 232 and a second arm 236. The first arm 232 has a proximal end that attaches to the corresponding elongate member 223 through a selectable one of the apertures 224 and a distal end having a tube clamp 234 that is configured to engage the dispersing tube 210. A plurality of slots 233 are provided along a distal portion of the first arms 232. The second arm 236 of each hanger subassembly 230 has a proximal end that attaches to a corresponding one of the elongate members 223 through a selectable one of the apertures 224, and a distal end that includes a connecting plate 235 configured to slidably engage a selectable one of the slots 233 of the corresponding first arm 232. An attachment member, for example a locking pin, bolt, shackle, cable tie, or the like (not shown), may be provided to extend through an aperture in the connecting plate 235 to lock the second arm 236 to the selected location of the first arm 232.

It will be appreciated from FIGS. 2A-2C and the above description that the hanger subassemblies 230 allow great flexibility in positioning the clamps 234 that engage the dispersing tube 210, for example, allowing the pitch of the helical dispersing tube 210 to be selected or adjusted for optimal feed dispersion.

In this embodiment the dispersing tube clamps 234 are quick-release clamps, for example, clam shell clamps comprising separable left and right portions, as are well known in the art. The quick-release clamps 234 facilitate removing and replacing the dispersing tube 210, for example for cleaning or maintenance, to allow the user to install different dispersing tubes 210 as discussed above, or to allow the attachment subassemblies 230 to be moved to a folded position, for example, during harvesting or other fish tending operations.

Figure 3:
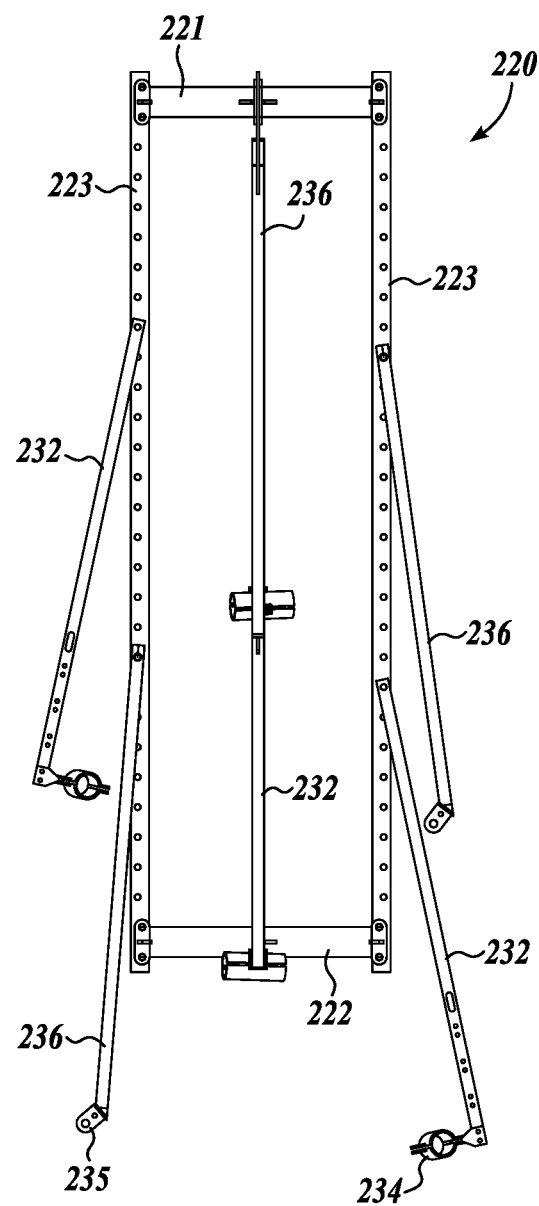
FIG. 3 is a front view of the fish feed attachment assembly shown in FIG. 2A, with the hanger subassemblies shown in a folded position.

As shown in FIG. 3, the hanger subassemblies 230 may be configured in a folded position when the dispersing tube 210 is removed by disconnecting the second arm 236 from the corresponding first arm 232 for each of the hanger subassemblies 230, and pivoting the arms 232, 236 to a lower position. The foldable hanger subassemblies 230 are advantageous, for example, to reduce the size of the hanger assembly 220 during harvesting operations, and the like.

Although this disclosed embodiment has an attachment assembly with four hanger subassemblies 230, it is contemplated that other embodiments may have more or fewer hanger subassemblies 230. In some embodiments the helical feed dispersing tube 210 may be longer than is shown in the figures, for example, extending 360 degrees, 540 degrees, 720 degrees, or more, around the spar buoy 110.

Figure 4:
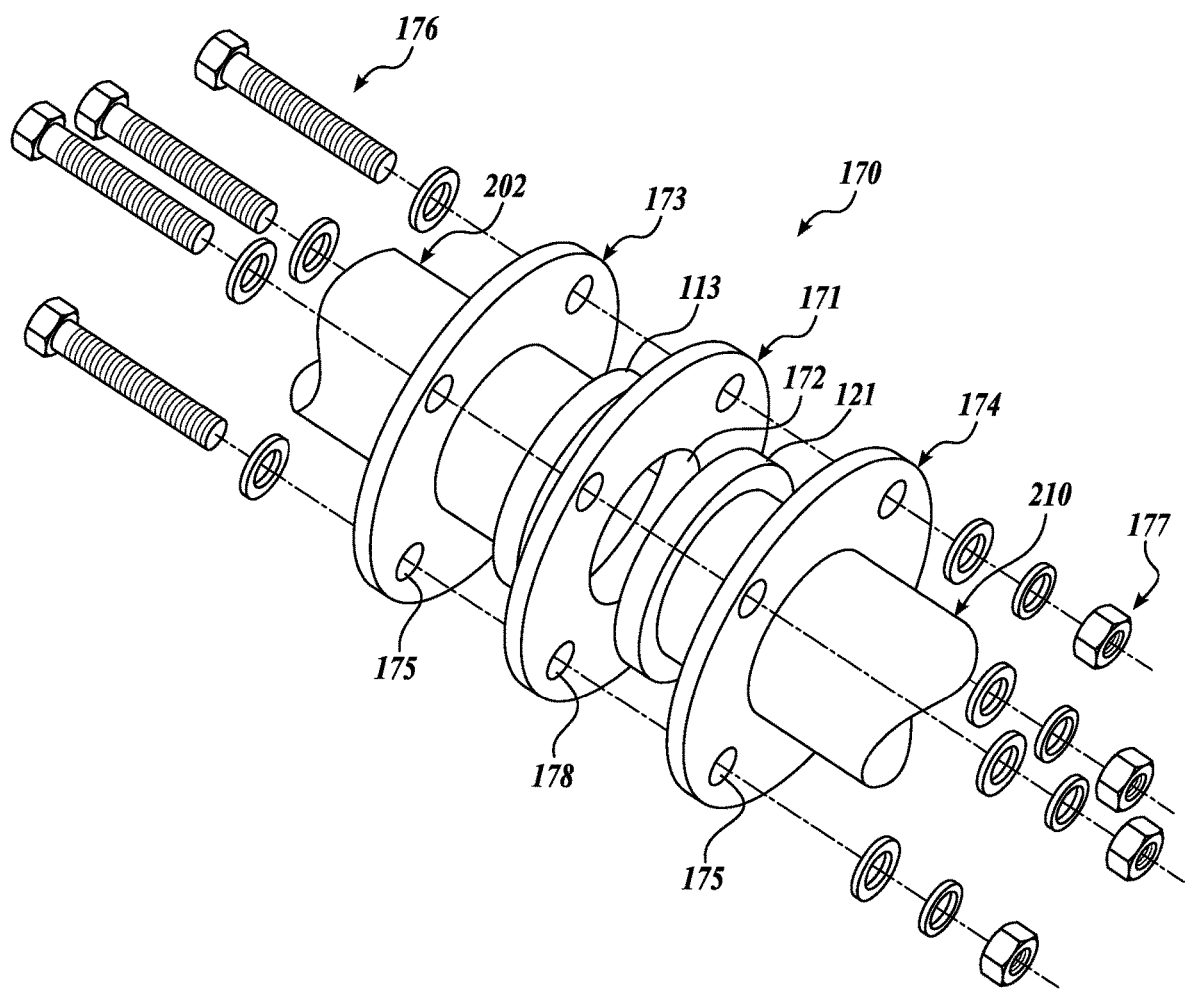
FIG. 4 is an exploded perspective view of a low-turbulence connection for connecting the feed supply line to a helical feed dispersing tube.

FIG. 4 is an exploded view of the low-turbulence connection 170 connecting the supply line 202 to the helical feed dispersing tube 210. Fish feed for aquaculture typically comprises small pebbles of feed that may be suspended in a fluid. The food pebbles may have a transverse dimension, for example, between one-eighth inch and one inch. The feed and transporting fluid are flowed through the supply line 202 to the helical feed dispersing tube 210. High turbulence or other interference in the joint or connection to the dispersing tube 210 can cause the fish feed to disintegrate or crumble, which can result in a significant loss of feed during the feeding process. Feed is a significant cost in aquaculture, and particularly in off-shore aquaculture, which requires transporting the feed significant distances to the fish pen. Therefore, it is very desirable to minimize the loss of feed.

The low-turbulence joint 170 comprises a flanged input end 121 on the feed dispersing tube that is sized to abut a corresponding flanged output end 113 on the supply line 202, with a gasket 171 there between. The gasket 171 has an aperture 172 that matches the inside diameter of the supply line 202 and the dispersing tube 210 at the joint 170.

A first annular disc 173 is sized and positioned to abut the flanged output end 113, and a second annular disc 174 is sized and positioned to abut the flanged input end 121. The first and second annular discs 173, 174 have corresponding apertures 175 that are sized and positioned to receive attachment hardware, for example, bolts 176 and nuts 177 to urge the annular discs 173, 174 towards each other, accurately positioning and compressing the flanged ends 113, 121 towards each other. Preferably, the gasket 171 also has corresponding apertures 178, so that the gasket 171 is also accurately positioned to not interfere with flow though the joint 170.

While illustrative embodiments have been illustrated and described, it will be appreciated that various changes can be made therein without departing from the spirit and scope of the invention.

The invention claimed is:

1. A fish feed dispersing apparatus for an aquaculture fish pen comprising:
   a helical dispersing tube having an inlet end configured to receive fish feed from a source of fish feed and a plurality of apertures disposed at spaced intervals along the helical dispersing tube; and
   a mounting assembly having two spaced-apart attachment members configured to be fixed to the fish pen, a plurality of elongate members attached to and extending between the two attachment members, and a plurality of hanger subassemblies, each hanger subassembly having a proximal end attached to a corresponding one of the plurality of elongate members and a distal end comprising a clamp configured to engage the helical dispersing tube.

2. The fish feed dispersing apparatus of claim 1, wherein the plurality of apertures are not aligned on the helical feed dispersing tube.

3. The fish feed dispersing apparatus of claim 1, wherein the plurality of apertures open outwardly away from the helical dispersing tube.

4. The fish feed dispersing apparatus of claim 1, wherein the two attachment members are configured to be fixed to a spar buoy of the fish pen.

5. The fish feed dispersing apparatus of claim 4, wherein when the fish feed dispersing apparatus is fixed to the spar buoy, the helical dispersing tube continuously decreases in elevation such that the plurality of spaced apertures are at different depths.

6. The fish feed dispersing apparatus of claim 4, wherein a distal end of the helical dispersing tube is an open outlet.

7. The fish feed dispersing apparatus of claim 4, wherein the helical dispersing tube defines a circular helix.

8. The fish feed dispersing apparatus of claim 4, wherein each of the hanger subassemblies comprises a first arm that defines the proximal end and the distal end, and further comprising a second arm having a proximal end connected to the corresponding elongate member and a distal end that engages the first arm at a selectable intermediate location on the first arm.

9. The fish feed dispersing apparatus of claim 8, wherein the plurality of elongate members each comprises a plurality of apertures for attaching the proximal end of the first arm and the second arm to a selectable location on the corresponding elongate member.

10. The fish feed dispersing apparatus of claim 9, wherein the helical dispersing tube is elastic, and wherein a pitch of the helical dispersing tube is determined by the selected location of the hanger assemblies on the corresponding elongate members.

11. The fish feed dispersing apparatus of claim 1, wherein the plurality of hanger subassemblies comprise at least four hanger subassemblies.

12. The fish feed dispersing apparatus of claim 1, wherein the plurality of apertures disposed at spaced intervals along the helical dispersing tube comprise at least seven apertures.

13. The fish feed dispersing apparatus of claim 8, wherein the first and second arms are configured to pivot toward the corresponding elongate member into a folded position when the helical dispersing tube is removed.

14. A center spar fish pen configured to receive fish feed from a source of fish feed, the fish pen comprising:
   a center spar buoy connected to a rim assembly with a cable system;
   a fish enclosure defining an enclosed volume and attached to the spar buoy and to the rim assembly; and
   a fish feed dispersing apparatus disposed within the enclosed volume of the fish enclosure, the fish feed dispersing apparatus comprising:
   a helical dispersing tube having an inlet end configured to receive fish feed from a source of fish feed and a plurality of apertures disposed at spaced intervals along the helical dispersing tube; and
   a mounting assembly having two spaced-apart attachment members configured to be fixed to the fish pen, a plurality of elongate members attached to and extending between the two attachment members, and a plurality of hanger subassemblies, each hanger subassembly having a proximal end attached to a corresponding one of the plurality of elongate members and a distal end comprising a clamp configured to engage the helical dispersing tube.

15. The center spar fish pen of claim 14, wherein the plurality of apertures are not aligned on the helical feed dispersing tube.

16. The center spar fish pen of claim 14, wherein the plurality of apertures open outwardly away from the helical dispersing tube.

17. The center spar fish pen of claim 14, wherein when the fish feed dispersing apparatus is fixed to the spar buoy, the helical dispersing tube continuously decreases in elevation such that the plurality of spaced apertures are at different depths.

18. The center spar fish pen of claim 14, wherein a distal end of the helical dispersing tube is an open outlet.

19. The center spar fish pen of claim 14, wherein each of the hanger subassemblies comprises a first arm that defines the proximal end and the distal end, and further comprising a second arm having a proximal end connected to the corresponding elongate member and a distal end that engages the first arm at a selectable intermediate location on the first arm.

20. The center spar fish pen of claim 19, wherein the plurality of elongate members each comprises a plurality of apertures for attaching the proximal end of the first arm and the second arm to a selectable location on the corresponding elongate member.

21. The center spar fish pen of claim 20, wherein the helical dispersing tube is elastic, and wherein a pitch of the helical dispersing tube is determined by the selected location of the hanger assemblies on the corresponding elongate members.

22. The center spar fish pen of claim 14, wherein the plurality of hanger subassemblies comprise at least four hanger subassemblies.

23. The center spar fish pen of claim 14, wherein the plurality of apertures disposed at spaced intervals along the helical dispersing tube comprise at least seven apertures.

\* \* \* \* \*